United States Patent [19]
Falanga

[11] Patent Number: 5,245,479
[45] Date of Patent: Sep. 14, 1993

[54] VEHICULAR, SIDE, REAR VIEW PRISMATIC MIRROR SYSTEM

[76] Inventor: Kenneth B. Falanga, 130 Brooklyn Ave., Jefferson, La. 70121

[21] Appl. No.: 846,735

[22] Filed: Mar. 5, 1992

Related U.S. Application Data

[63] Continuation of Ser. No. 432,121, Nov. 6, 1989, abandoned, which is a continuation-in-part of Ser. No. 170,262, Mar. 18, 1988, abandoned.

[51] Int. Cl.$^5$ .................... G02B 17/00; G02B 5/04; G02B 5/08
[52] U.S. Cl. .................... 359/838
[58] Field of Search ........... 350/627, 625, 600, 164, 350/276 R, 286, 287, 642; 359/866, 864, 838, 601, 831, 833, 837, 884, 580

[56] References Cited

U.S. PATENT DOCUMENTS

| | | | |
|---|---|---|---|
| Re. 30,673 | 7/1981 | Feinbloom | 350/288 |
| 2,763,187 | 9/1956 | Wiener | 88/86 |
| 3,104,274 | 9/1963 | King | 88/87 |
| 3,235,397 | 2/1966 | Millendorfer | 350/164 |
| 3,267,806 | 8/1966 | Azegami | 88/84 |
| 3,501,227 | 3/1970 | Landen | 350/303 |
| 3,712,715 | 1/1975 | Wagner | 350/304 |
| 3,797,920 | 3/1974 | Beach, Jr. | 350/303 |
| 3,972,601 | 8/1976 | Johnson | 350/303 |
| 4,200,359 | 4/1980 | Lawson | 350/303 |
| 4,223,983 | 9/1980 | Bloom | 350/303 |
| 4,311,363 | 1/1982 | Marsalka et al. | 350/299 |
| 4,630,905 | 12/1986 | Blom | 350/642 |

FOREIGN PATENT DOCUMENTS

| | | | |
|---|---|---|---|
| 2425502 | 12/1975 | Fed. Rep. of Germany | 350/627 |
| 2701817 | 7/1978 | Fed. Rep. of Germany | 350/627 |
| 2756573 | 7/1978 | Fed. Rep. of Germany | 350/625 |
| 3525261 | 11/1985 | Fed. Rep. of Germany | 350/627 |

*Primary Examiner*—Jon W. Henry
*Attorney, Agent, or Firm*—C. Emmett Pugh

[57] ABSTRACT

An automotive, side, rear view mirror accessory in the form of a prism configured to be adhesively attached to the standard automotive, side, rear view mirror, providing the user through refracted light with a wider scope of vision with regard to the reflected image in the rear view mirror. The prism's positioning, size, and angle of refraction can be configured in varying degrees in order to provide the user with maximum efficient viewing of any "blind spot" which might exist at any particular angle with regard to the normal angle of view. The prism unit may be adhesively mounted to a standard automotive side rear view mirror utilizing "off-the-shelf," transparent cement, or, alternately, the unit may be a one-piece construction wherein the prism and mirror are molded as one, or the prism itself may have a backing of reflective material, thereby dispensing with the necessity of transparent cement. The prism is located at the outer edge, namely, on the outer, left edge for the driver's side, rear view mirror and on the outer, right edge of the side, rear view mirror on the passenger's side.

2 Claims, 4 Drawing Sheets

VEHICULAR, SIDE, REAR VIEW PRISMATIC MIRROR SYSTEM

STATEMENT REGARDING RELATED APPLICATION

This application is a continuation of Ser. No. 432,121, filed Nov. 6, 1989, now abandoned, which in turn is a continuation-in-part of application Ser. No. 07/170,262, filed Mar. 18, 1988, and entitled "Vehicular Rear View Prismatic Mirror System", now abandoned.

BACKGROUND of INVENTION

1. Field of Invention

The present invention is directed to vehicular or automotive side, rear view mirrors, and in particular to an auxiliary refractor for such mirrors, comprising for example a prism, which when applied, or located adjacent, to the mirror modifies the mirror's field of view by refracting the reflected light in such a manner as to widen the effective field of view of the mirror. The present system is intended to be used in conjunction with the side automotive rear view mirrors, including particularly the driver's side and also, if desired, the passenger's side, as well as the interior mirror.

2. Prior Art & General Background

There have been many attempts in the past to modify rear view mirrors to change their field of view.

A list of prior patents which may be of interest are listed below:

| Patent No. | Patentee(s) | Issue Date |
|---|---|---|
| 2,763,187 | H. Wiener | Sept. 18, 1956 |
| 3,104,274 | G. W. King | Sept 17, 1963 |
| 3,267,806 | Keij Azegami | Aug. 23, 1966 |
| 3,501,227 | W. J. Landen | March 17, 1970 |
| 3,712,715 | Carl E. Wagner | Jan. 23, 1973 |
| 3,797,920 | Theodore L. Beach | March 19, 1974 |
| 3,972,601 | William Johnson | Aug. 3, 1976 |
| 4,200,359 | David Lawson | April 29, 1980 |
| 4,223,983 | Stephen Bloom | Sept. 23, 1980 |
| 4,311,363 | Joseph Marsaika | Jan. 19, 1982 |
| RE 30,673 | William Feinbloom | July 14, 1981 |
| Foreign Patents: West Germany | | |
| 2,425,502 | Marhauer | December 1975 |
| 2,701,817 | Muller | July, 1978 |
| 2,756,573 | Brunner | July, 1978 |
| 3,525,261 | Stein | November, 1985 |

The above cited prior art may be generally divided into three catagories:

(1) Those patents directed to the addition of a supplemental, relatively small mirror placed at an angle on the rear view mirror (U.S. Pat. Nos. 4,200,539; 4,311,363 and 4,223,983);

(2) Those directed to the addition of a curved (either convex or concave) supplemental mirror on the main rear view mirror (U.S. Pat Nos. 3,104,274 and 3,267,806); and (3) Those directed to two or more flat mirror sections juxtaposed to give deferring angles of view (U.S. Pat. Nos. 3,712,715; 3,797,920; and 3,792,601).

The first cited group above is more directly pertinent to the preferred embodiments of the invention, while the second group has only secondary interest, and the third group is merely included for general background information.

In the three patents cited in the first group above, a flatter, curved mirrored surface is supported on the main mirror surface at an angle in order to change the field of view to expose the "blind spot" of the rear view mirror.

Only Feinbloom appears to relate (although unclearly and in very small part) to transmission and refraction of light into a wedge-configured medium, as opposed to a surface-type reflection from the angled exterior surface, as disclosed through out the prior art. For reasons discussed below, Feinbloom is clearly distinguishable from the present invention.

In contrast, the present invention uses a refractive technique, in which the light passes into the structure and is reflected off the back surface, with the refraction causing the difference in the angle of the field of view. It is apparent, based upon careful review of the prior patents cited above, that none of the previous patents contemplated the utilization of refractive technique in the area contemplated in the present invention.

In addition, the present invention offers the advantage of increased clarity of the additional field of view over that offered in the prior art. For example, U.S. Pat. Nos. 3,267,806, 4,311,363 and 3,104,274 both offer wide angle views, but at the expense of a spherical aberration, which greatly distorts the angled view, to such a point that it becomes difficult to actually ascertain the location of any objects of the view and their distance from the driver.

With regard to the Feinbloom '673 patent, it is respectfully submitted that the disclosure, a reissue patent, is defective and lacking to the point where it is insufficient to teach one of ordinary skill in the art to which the invention pertains how to make and use the invention without undue experimentation and thus does not fulfill the requirements of the first paragraph of 35 USC 112.

It appears that the Feinbloom originally sought to claim an angled mirror attachment to vehicular side view mirrors, but for whatever reason was unsuccessful.

The reissue patent also apparently only scantly "disclosed" an alternative embodiment teaching the utilization of a "prism" in a single top view drawing (FIG. 4) in conjunction with a mirror, but does not disclose how to make and use the invention. Indeed, the little verbiage citing FIG. 4 is contrary to accepted teachings in optics; further, it is apparent that the "prism" embodiment recited in FIG. 4 and taught in the application was a defective afterthought. It is for this reason Feinbloom is grouped in the first category discussed above.

The '673 patent in fact, while entitled "Side View Mirror Employing Prism For Blind Spot Correction", only has one relatively short disclosure paragraph in the entire patent relating to the prism/mirror embodiment, with the rest of the disclosure devoted to angled mirror accessories for enlarging the users field of view. This is ironic, because the principle teachings of the patent do not relate to refractive optics at all, and in fact does not even mention refraction.

In fact, if one of ordinary skill were to rely on the disclosure for making and using the invention, not only would there be required much undue experimentation, but the person would only have the figure to rely upon, as the written disclosure relating to the figure is incorrect and inconsistent, for the reasons discussed infra. The mere scanty, top view figure would be insufficient for one of ordinary skill to reduce the invention to practice in a satisfactory manner, as shown more fully below.

With regard to the Feinbloom discussion of the FIG. 4 embodiment (column 5, line 14—33), optics does not teach any concept cited by Feinbloom as "base angle".

The side of the prism which subtends the apical angle is called the "base". *The Principles of Ophthalmic Lenses,* M. Jalie, Haxell & Vinney, Ltd. (G.B.; 4th Ed. 1984).

The deviation produced by a prism depends upon its apical angle and its refractive index. id.

From *OPTICS* by A. H. Tunnacliffe and J. G. Hirst (printed in Great Britain by the Eastern Press, Ltd., 1981 and reprinted 1983), the index listings under angles are:

| | |
|---|---|
| Apical | of reflection |
| Brewster's | of refraction |
| critical | solid |
| of incidence | |

From Mosby's *Comprehensive Review Series* "Review of Refraction" Jack Hartstein M.D., Copyright 1971, by the C. V. Mosby Company, printed in U.S.A. (St. Louis):

"Definition of a Prism: A prism is an optical medium formed by two sides that are plane but not parallel. In the simplest form of a prism as used for refraction, the two refracting surfaces need to be considered—the light entering the prisms at the first surface and leaving at the second. The point of intersection of these two surfaces is the apex, or refracting edge, of the prism. Any section through the prism perpendicular to one of the refracting surfaces is a principal section, and the apical angle is the refracting angle. The prism will permanently change the direction of the rays, but, for practical purposes, will not change their relationship toward each other."

If one were to guess at what Feinbloom's "base angle" might be, using a right angle prism as an example, one would logically deduce that:

The right angle A is constant at 90 degrees, and the apex B is the narrowest part of the prism. The only angle left would be the point at which the base meets the hypotenuse. One would then conclude that this must be what is referred to as the "base angle" C.

If this is the case then we can determine the value of the apical angle in a prism with a "base angle" of sixteen degrees.

If A is 90 degrees and C is 16 degrees, then from basic geometry B must be 74 degrees.

It is impossible to determine the exact angle of deviation, since Feinbloom's description gave no "index of refraction" of the medium used. However, generally with prisms of large apical angle "if the angle of incidence on the first face of a prism is small, then it follows that the angle of incidence inside the prism at the second surface will be large, assuming that the apical angle of the prism is sufficiently large. This situation provides the possibility for total internal reflection to occur at the second face of the prism, for if the angle of incidence at the second surface exceeds the value of the critical angle, then no light will be refracted out of the second face of the prism." *Optics,* A. H. Tunnacliffe & J. G. Hirst; supra.

It can thus be concluded that this is a prism through which no light can pass in the described fashion.

The sentence "A prism will provide the angle of sixteen degrees if the base angle is sixteen degrees" is inconclusive, confusing and erroneous, since to determine the angle of deviation (which is not mentioned) of a prism, one must know the apical angle of the prism and the index of refraction of the medium being used (which also is not mentioned.)

Since the term "base out" is written in quotation marks, one can assume that some special significance should be attached to it.

In opthamalmic practice prisms are often used to correct a "phoria" (Mosby's *Review of Refraction,* Jack Hartstein, M.D.; supra) defined as a tendency to turn the eyes from parallelism—in, up, out or down. This is often achieved by situating prisms over the independent eyes in what in the ophthalmic trade has referred to as, base in, base out, base down, base up, or a combination depending on the type of phoria involved (orthophoria, esophoria, exophoria, etc.) The term "base out" refers to the prism's apex to base axis placed between the patient's nose and temple with the base at the temporal side. So "base out" prism in the patient's left eye would place the base of the prism to the left. However, base out prism over the patient's right eye places the base edge of the prism to the right.

It would appear as if Feinbloom is using the terminology of one art to describe a different art in a way that does not properly communicate a meaningful concept.

This is consistent with the assertion above that the prism embodiment was inserted as an incomplete, defective, afterthought, and explains why the disclosure was so scanty and flawed. It thus appears that Feinbloom had no idea as to how to reduce the invention to practice, much less enable the specification to teach one of ordinary skill how to make and use the invention.

Additionally, whatever else may be said of the Feinbloom disclosure, the scanty "disclosure" of the FIG. 4 drawing, particularly in the context of FIGS. 2 & 3, would lead one to put the "prism" section, whatever it might be, in the upper section of the mirror straddling across its central portion. Whatever image it would produce, it would be difficult for a viewer to put it into context with the mirrored image and be meaningful and useful.

As opposed to Feinbloom, the present application teaches in very specific terms how to make and use the invention, including the selection of the appropriate refractive medium, calculation of the apical angle, location and positioning of the system, etc. In short, it enables one of ordinary skill to make and use the invention, as required by the federal patent laws.

With regards to Marhauer, applicant is unable from its abstract to decipher the inventive concept underlying the cited patent. However, the drawings appear to indicate angled reflective means of providing an increased field of view, and not the refractive prism means as contemplated in the present invention.

The Landen patent is likewise fully distinguishable, but for a different reason. Landon contemplates a means of enlarging a field of view different from that contemplated in the present invention, which addresses the field of refractive optics, as opposed to angled mirrors (class 1 addressed above).

GENERAL, SUMMARY DISCUSSION OF THE INVENTION

The present invention thus is directed to vehicular or automotive, side, rear view mirrors, and in particular to an auxiliary refractor for such mirrors, comprising for example a prism, which when applied to the mirror modifies the observer's field of view by refracting the reflected light in such a manner as to widen the field of view of the observer. The present system is intended to be used in the side automotive rear view mirrors and not the interior mirror.

The preferred embodiment of the present invention preferably utilizes a prism with a mirror coating on its base. This feature obviates the necessity for the observed image from having to traverse any adhesives and mirror glass before reflecting and refracting back the image to the observer, thereby lessening distortion. The present invention also teaches the utilization of an opaque edge coating and an anti-reflective film for further reducing distortion and increasing clarity.

The size and shape of the prism may be varied according to the application. However, its size is generally somewhat less than that of the rear view mirror to which it is to be applied. Additionally, the prism preferably is located at the outboard side of the mirror and preferably occupies all of that side.

The present invention may be offered to the public in the form of a package comprising the mirror with the prism intact, or may be offered in a kit form, in which the user adhesively attaches the prism to the desired area of the mirror presently used on the automobile or other vehicle. Additionally, the diopter power and apical angle may be adjusted to allow a steeper or narrower displacement, thus relieving different "blind spot" areas.

The exemplary embodiment of the present invention comprises a crown glass prism lens with an index of refraction of 1.523 adhesively attached to the outer area of a standard automotive side view mirror. However, a medium with a high refractive index, such as flint glass, may be used to reduce the thickness of the base edge. Even a hard resin such as CR39 may be substituted.

The prism's positioning, size and angle of refraction should be configured to provide its user with maximum efficient viewing of any "blind spots" which exist at any particular angle with regard to the normal angle of view. While the conventional side rear view mirror provides a predictable general reflection of the area immediately opposite that of the angle of the mirror, the prismatic mirror system of the present invention allows a relatively undistorted view of an area substantially outside the general area of view associated with the conventional rear view mirror. This area has heretofore been referred to as a driver's "blind spot." The utility of having a relatively inexpensive and easily installed attachment to an automobile mirror allowing view of this "blind spot" in a rather convenient and undistorted manner is apparent.

It is thus an object of the present invention to provide an inexpensive, easily attached accessory for a conventional side, rear view automobile mirror which widens the user's angle of view, thus eliminating the "blind spot." In accordance with the this objective of the invention, a prism in the form of a lens, the present, preferred embodiment made of crown glass with an index of a refraction of 1.523, having reflective coating incorporated thereon, is adhesively attached to a desired area of a conventional automobile rear view mirror, preferably at its outer edge portion.

The size and shape of the prism may be varied according to the application. The present preferred embodiment of the invention has exemplary dimensions of 70 millimeters in length with a width of 32 millimeters, with a apical height of 0.5 millimeter and a base height of 6.5 millimeters. Of course, the size and shape of the prism may vary according to the contemplated use.

The present construction of the preferred embodiment of the present invention is inexpensive and easily attached. It is believed that the cost of this unit is substantially less than that of the prior art, which primarily comprised complex, mirrored curvatures which are typically expensive to manufacture.

It is another object of the invention to provide an effective, inexpensive and easily installed rear view mirror accessory in the form of a kit, in which the prism would be adhesively mounted to an already existing side, rear view mirror, or as a one piece construction for eliminating the "blind spot" utilizing the refractive properties of glass, which result in less distortion, in lieu of the prior art, which utilize complex curvatures which resulted in spherical abberations and other distorted properties.

It is still another object of the present invention to provide a rear view mirror accessory utilizing the refractive properties of a prism in combination with a mirror coating thereon, anti-reflective coating on its viewing side, and opaque edge coating(s) for reducing distortion and thereby increasing viewing efficiency.

Those advantages and objects discussed above will be supplemented by the discussion and figures disclosed infra.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED, EXEMPLARY EMBODIMENTS

Figure 1:
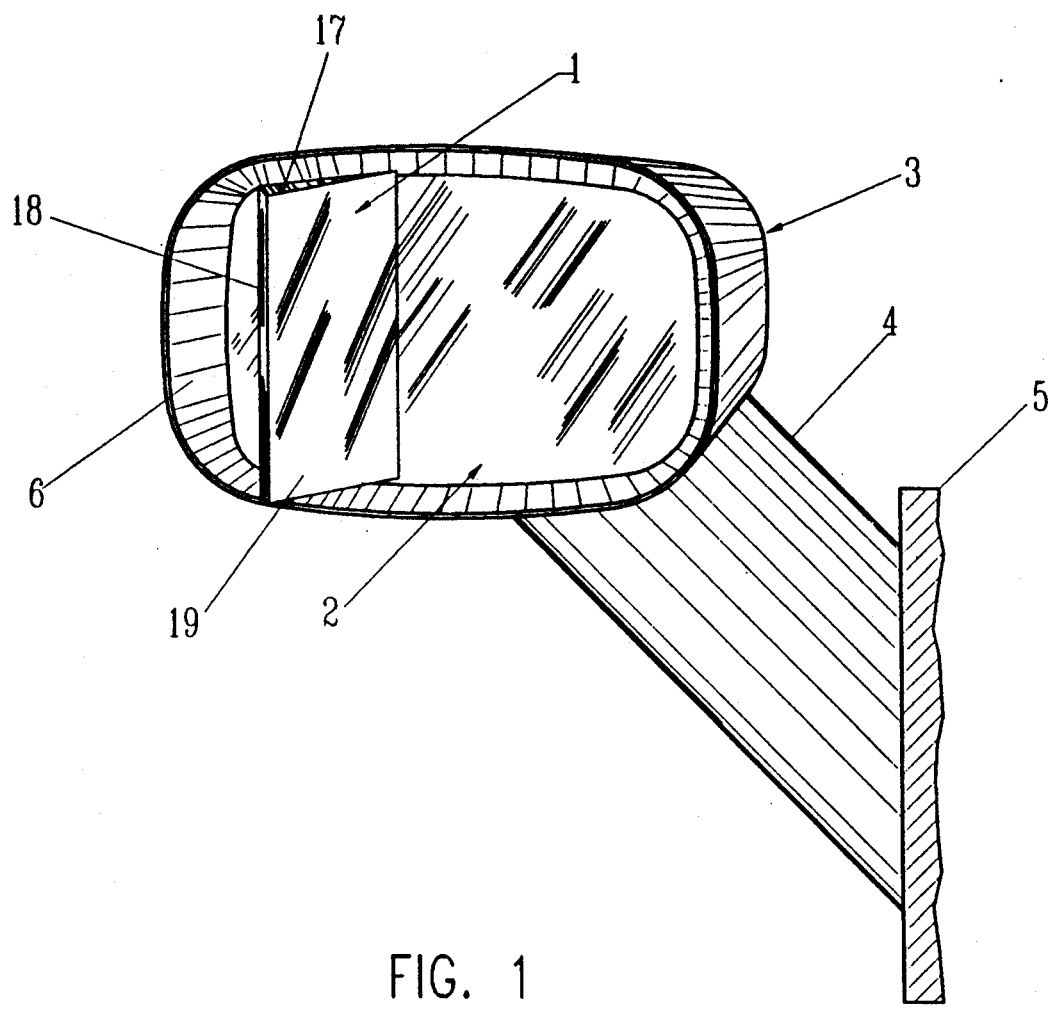
FIG. 1 is a front, perspective view of an exemplary, driver's side, rear view mirror of the present invention with a prism portion mounted on the outer edge of the mirror, that is, at the edge portion farthest from the vehicle.
Figures 2, 2A, 2B:
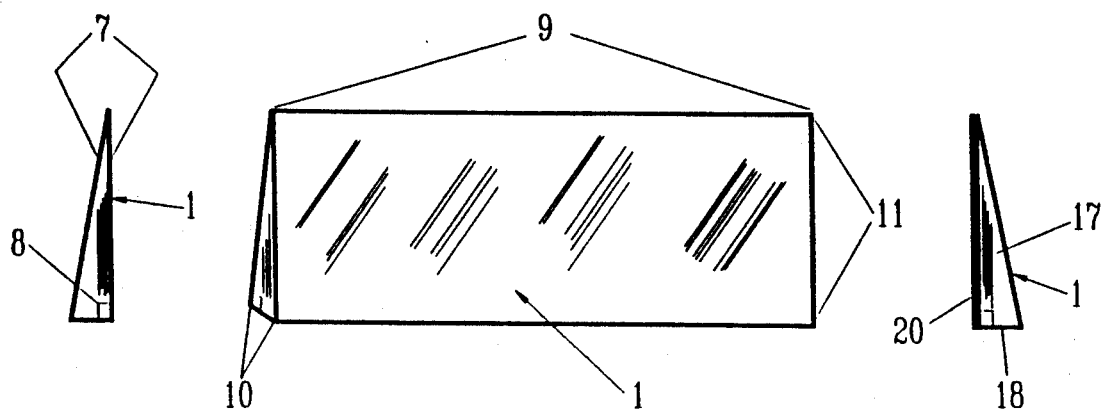
FIGS. 2, 2A & 2B are front/perspective, cross-sectional and side views, respectively, of an exemplary ten diopter prism which can be used in the exemplary embodiment of the present invention.
Figure 3:
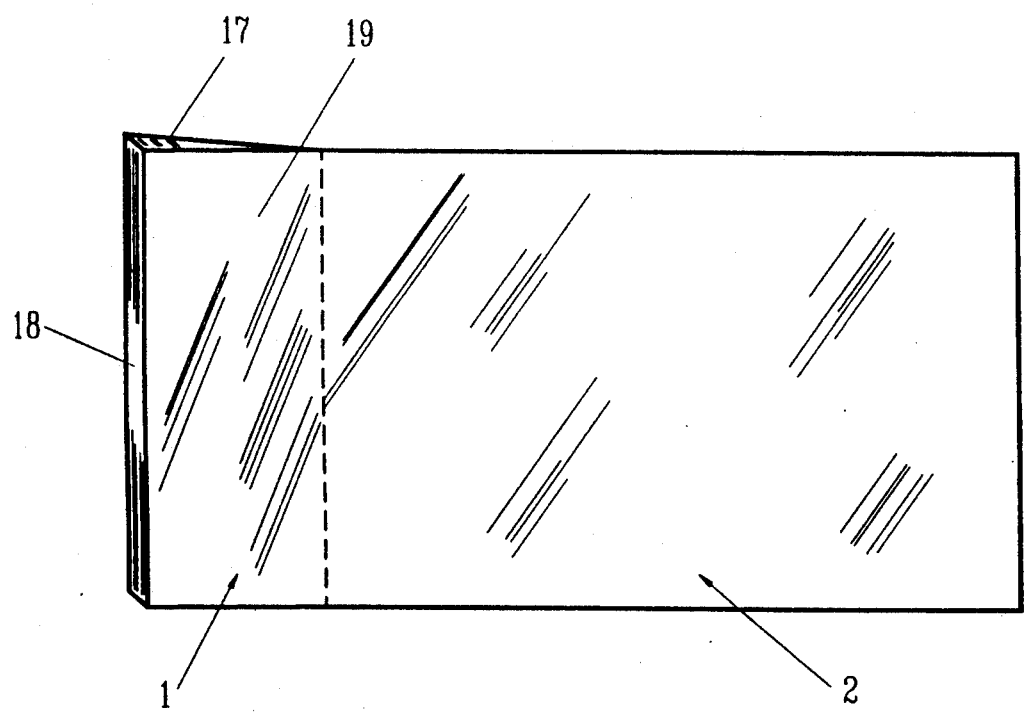
FIG. 3 is a front, perspective view of the exemplary embodiment of the present invention as mounted on a standard size rear view mirror.

As may be seen in FIGS. 1-3, a first, exemplary embodiment of the present invention includes the mounting of a prism 1 onto the outer periphery of a standard, side, rear view mirror 2 utilized as part of a driver's side, rear view mirror system 3, such as that mounted on automobiles, trucks, motorcycles, and the like. The prism 1 can be provided in the form of a single, unitary piece or made of two or more individual prism sections joined together.

The side, rear view mirror system 3 comprises a housing or support 6, a mounting arm 4, and that side portion 5 of the automobile, truck, motorcycle, or other vehicle, etc., to which the mirror is attached. The mirror itself 2 is mounted within the housing 6 and may be adjusted via remote or manual controls, if so desired.

The prism 1 acts to refract the light in such a manner as to effectively provide a widened angle of view for the user of the device.

The prism 1 has a triangular configuration or cross-section having, for example, a ninety degree base angle 8 and an eleven degree apical angle 7. The base length 9 of the exemplary embodiment is approximately seventy (70) millimeters, with a base thickness 10 of approximately six and a half (6.5) millimeters. The width or height 11 of the prism in the exemplary embodiment is approximately thirty-two (32) millimeters.

As can be seen in FIG. 1, the prism portion 1 is mounted on the outside edge portion of the housing support 6, that is, at the edge farthest away from the vehicle 5. Additionally, the prism portion 1 preferably occupies all of that side of the rear view mirror system, with the heights of the apical end of the prism being the same as the portion of the mirror 2 which it contacts.

The prism 1 is configured in such a manner as to be adhesively joined to the mirror 2 to provide a wider field of view. However, the prism 1 and mirror 2 could be manufactured as a single, unitary structure, allowing for easier construction and less potential for visual distortion.

The prism 1 may be adhesively attached to the mirror 2 via one of the many glass cements on the market. In the exemplary embodiment, Norland optical adhesive #61 of Norland Products, Inc., New Brunswick, N.J. was used with satisfactory results.

The prism 1 primarily comprises a transparent, triangular-configured piece of crown or other glass, having for example a refractive index of 1.523. This index is for exemplary purposes only, and it is noted that a medium with a higher refractive index, such as for example flint glass, may be used to reduce the thickness of the base edge. Even such hard resins as CR 39 may be substituted.

In the preferred embodiment a mirrored base coating 20 (note FIG. 2B) is provided on that underside portion of the prism 1 contacting the mirror 2, such that the reflective surface is in communication with the prism and reflects light directed into the prism from the opposite face. This feature facilitates the installation of the "kit" without the necessity of transparent adhesive and, as explained more fully below, provides a superior medium for reflection of the image with reduced distortion and abberations in comparison to the prior art.

As light is absorbed along its path in a medium, it becomes necessary to decrease the amount of medium traversed. Because of this, the present invention, particularly when in the form of a separate appliance (or in this case, prism 1) adhered to an existing mirror 2, should itself have a reflective coating applied to its rear surface. In this way, the light does not have to travel through the prism, a layer of adhesive and then the original mirror, where it would then be reflected back again to repeat this course. If such were the case, the light would be absorbed and dispersed through each of the above media resulting in a significant loss of luminance. By mirror coating the base rear of the prism, the absorption of light can be greatly reduced resulting in a much brighter, distinct image.

As eight percent (8%) of all light transmitted through a medium is wasted in surface reflection, this may entail a serious loss of efficiency in a prism which already suffers from loss of luminance due to absorption. This can be greatly reduced by the application of the above referred to, anti-reflection coating on prism surface 19. For example, a layer of magnesium fluoride 1380 angstrom units thick or any one of a number of commercially available A.R. coatings could be used.

Experimentation has shown that such an application will reduce surface reflection by about sixty percent (60%). In a practical application not only will this increase the luminance of the rear reflective surface but also help to eliminate the ghost image of the side of the vehicle present in the front surface reflection.

In order to further reduce distortion or abberations and increase clarity, the preferred embodiment includes the utilization of an opaque coating, such as ordinary enamel paint, for the exterior, side and rear (or outer) edges 17 & 18, respectively, of the prism 1.

The opaque coating(s) would in effect reduce the occurrence of concentric images reflected internally in the prism. The edges would thus be masked, thereby preventing entrance of the concentric images through the edges of the prism. If the edges of the prism were to remain transparent, light incident the edges 17, 18 will be internally reflected and manifest themselves as a series of concentric patterns inside the prism thus confusing the primary image. The above improvements allow the reflection of an undistorted, bright, and "lifelike" image.

However, as an alternative embodiment of the present invention, the refracted imaging system of the invention could utilize a prism without such a reflective backing 20, as discussed above. In such a case, the adhesive utilized to affix prism 1 to mirror 2 should be transparent, as the light from the prism must reflected off of the mirror base to which it is adhered. Of course, as mentioned above, a transparent adhesive would be unnecessary when used in conjunction with the most preferred embodiment, as light would not have to pass through it.

Figure 4:
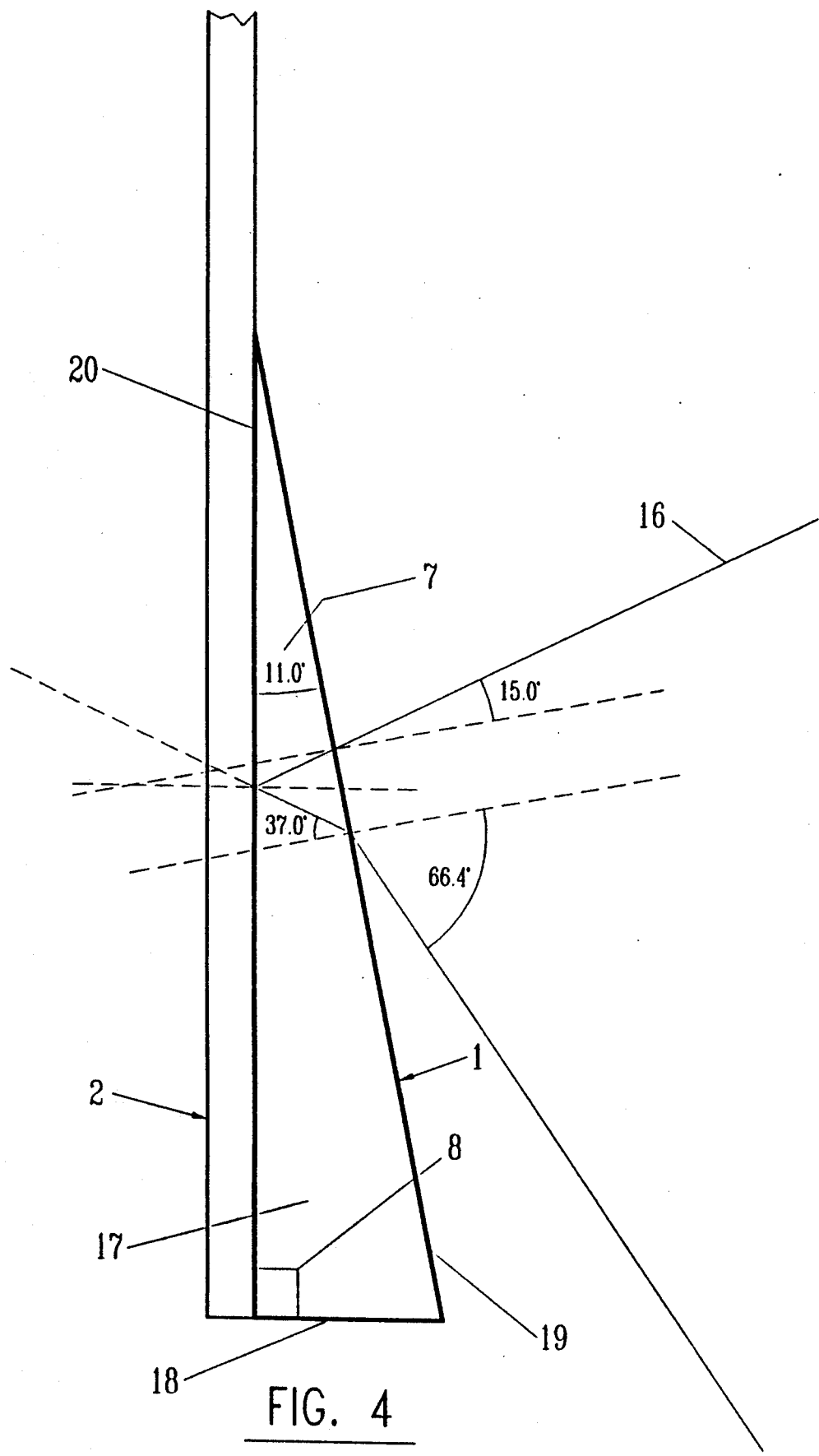
FIG. 4 is a top, enlarged view of the prism of FIGS. 2A & 2B mounted upon the rear view mirror with exemplary lines added indicating the path of refracted light as deflected by the ten diopter prism.

FIG. 4 further illustrates a diagram of refracted light by the exemplary ten diopter prism 1. An exemplary pencil beam 16 approaches the prism at an exemplary 66.4 degrees from the perpendicular of the prism surface. The beam 16 enters the prism 1 and is refracted twice, once upon entry and secondly after reflecting off of the mirror base coating 20 of prism 1. Upon departure from the surface 19 of the prism 1, the beam has reversed direction and exits at 15.0 degrees outside of the perpendicular of the surface of the prism.

The exit path of the beam 16 approximates that which the driver would be viewing in the rear view mirror. The resultant refraction allows the viewer to observe an angle which is not normally visible with the standard rear view mirror configuration and is considered to be a "blind spot."

Thus, as an improvement over the prior art, the present system offers a somewhat more accurate and undistorted view of this area, free from spherical aberrations, which are normally associated with rear view mirror accessories having curved mirrored surfaces. Any resultant chromatic aberration can be eliminated by the use of an achromatic prism and the surface reflection diminished by any number of commercial anti-reflection coatings. However, in preliminary tests these steps were found not to be necessary.

Figure 5:
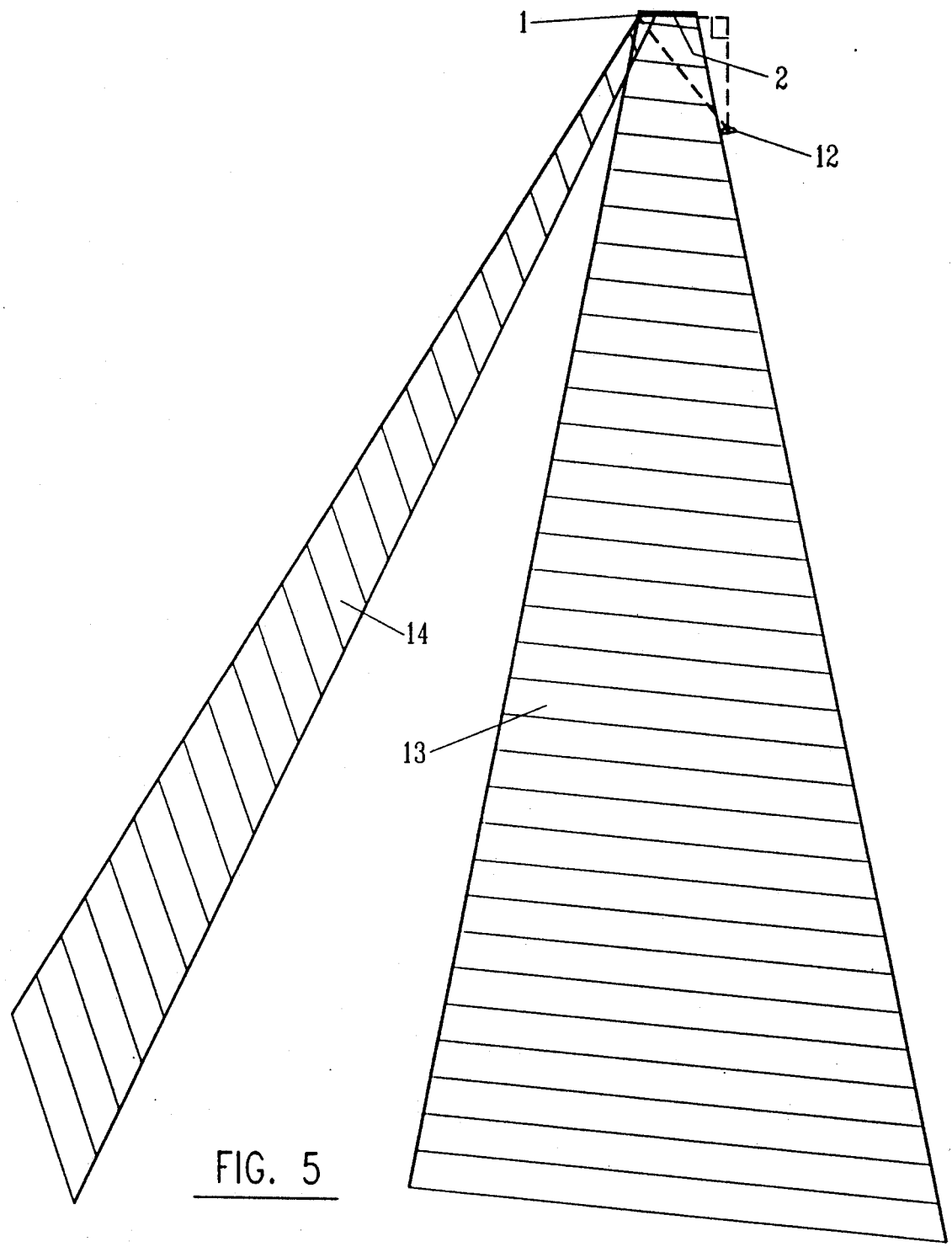
FIG. 5 is a partial, top view diagram of the exemplary embodiment of the present invention indicating the line of sight of an exemplary driver observing the mirror and prism at an approximate fifty degree angle.

FIG. 5 illustrates an exemplary field of vision, indicating the area of initial viewing 12 and the resultant reflective fields of view 13 and 14. Area 14, shaded, indicates that widened field of view resulting from viewing through the prism 1, while area 13 represents that reflected field of view normally associated with the standard rear view mirror 2. Again, note that the widened field of view 14 associated with the exemplary prism 1 may be varied via an increased index of refraction, an increase or decrease of the height of the base of the prism, etc.

In manufacturing the prism system of the invention, the entire system, including the prism(s) and mirror, may be applied as a separate unit and/or as an add-on accessory or molded or fused into the structure of the mirror itself.

Figure 6:
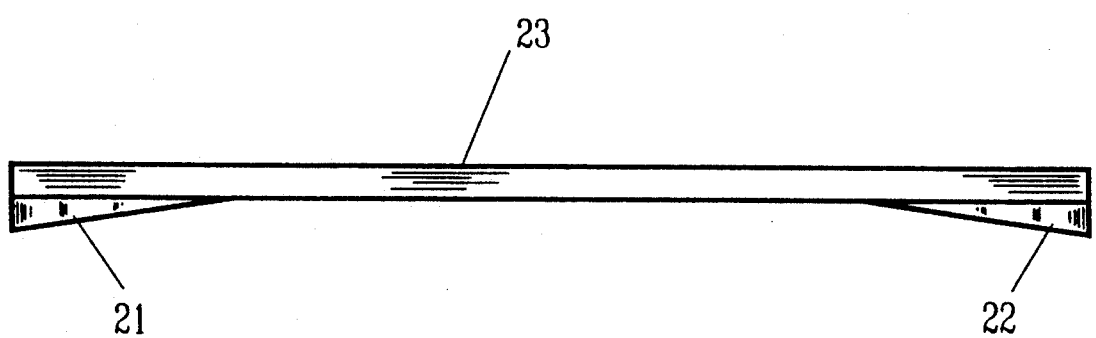
FIG. 6 is a plan, simplified diagram of a rear view mirror embodiment of the present invention.

The rear view mirror system of the present invention (note FIG. 6) comprises in effect a variation of the above discussed embodiments, but with different dimensions and the addition, of a second prism area. Thus, this system includes a driver's side prism 21 for reflecting an otherwise blind spot, a central, direct reflective system comprising essentially a mirror area 23, and a passenger side prism 22 for detecting blind spots from the rear area. While the configuration of this rear view mirror system varies from the above discussed principal embodiment for the side view system, the operation and theory are analogous. Similar diopter prisms, materials, and configuration is used in this system as taught in the primary embodiments.

While the present invention has been shown and described in what has at this time believed to be a most practical and preferred embodiment, it is recognized that departures may be made therefrom within the scope of the invention, which is therefore not to be limited to the details disclosed herein, but it is to be accorded the full scope of the claims as to embrace any and all equivalent devices and approaches.

The embodiments described herein in detail for exemplary purposes are of course subject to many different variations in structure, design, application and methodology. Because many varying and different embodiments may be made within the scope of the inventive concept(s) herein taught, and because many modifications may be made in the embodiments herein detailed in accordance with the descriptive requirements of the law, it is to be understood that the details herein are to be interpreted as illustrative and not in a limiting sense.

What is claimed is:

1. An accessory kit for a vehicular side, rear view mirror for expanding the viewer's field of vision produced by he vehicle's side rear view mirror, comprising:

a transparent, refracting prism of a size in its lateral extent substantially less than one half of the reflective front surface of the rear view mirror, the location and size of said prism being designed to expand the viewer's field of vision produced by the side rear view mirror, said prism further incorporating reflecting means in the form of a reflective surface coating on its base surface, said prism configured to modify the mirror's field of view by refracting the reflected light going through it in such a manner that the pencil rays will be deviated from the parallel to an outward angle proportionate to the prism's power, enlarging the user's field of view, said prism having a refractive index of about 1.5 and an apical angle of ten to twelve degrees; and adhesive means associated with said prism for adhesively mounting said prism to the reflective front surface of the side rear view mirror.

2. An accessory kit for a vehicular side, rear view mirror for expanding the viewer's field of vision produced by the vehicle's side rear view mirror, comprising:

a transparent, refracting prism of a size in its lateral extent substantially less than one half of the reflective front surface of the rear view mirror, wherein said prism has a width of 30-33 mm., a base length of 68-72 mm. and a base thickness of 6-7 mm., the location and size of said prism being designed to expand the viewer's field of vision produced by the side rear view mirror, said prism further incorporating reflecting means in the form of a reflective surface coating on its base surface, said prism configured to modify the mirror's field of view by refracting the reflected light going through it in such a manner that the pencil rays will be deviated from the parallel to an outward angle proportionate to the prism's power, enlarging the user's field of view; and adhesive means associated with said prism for adhesively mounting said prism to the reflective front surface of the side rear view mirror.

* * * * *